United States Patent
Hasegawa

(10) Patent No.: US 7,308,472 B2
(45) Date of Patent: Dec. 11, 2007

(54) SYSTEM ALLOWING DATA INPUT DEVICE TO REQUEST MANAGEMENT SERVER TO ASSIGN A DATA INPUT JOB TO ITSELF

(75) Inventor: Takeshi Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 930 days.

(21) Appl. No.: 10/455,615

(22) Filed: Jun. 6, 2003

(65) Prior Publication Data

US 2003/0229666 A1 Dec. 11, 2003

(30) Foreign Application Priority Data

Jun. 7, 2002 (JP) ............................. 2002-166977

(51) Int. Cl.
*G06F 15/16* (2006.01)
(52) U.S. Cl. ...................................... 709/201; 718/100
(58) Field of Classification Search ................ 709/218, 709/219, 225, 201; 707/203, 104.1; 345/700; 382/167; 705/2; 358/1.15; 718/100
See application file for complete search history.

(56) References Cited

U.S. PATENT DOCUMENTS

| | | | |
|---|---|---|---|
| 5,729,741 A * | 3/1998 | Liaguno et al. .......... 707/104.1 |
| 6,947,594 B2 * | 9/2005 | Watanabe et al. ........... 382/167 |
| 2002/0027675 A1 * | 3/2002 | Minato ...................... 358/1.15 |
| 2002/0049612 A1 * | 4/2002 | Jaeger et al. ................... 705/2 |
| 2002/0083079 A1 * | 6/2002 | Meier et al. ............. 707/104.1 |
| 2003/0115326 A1 * | 6/2003 | Verma et al. ................ 709/225 |
| 2003/0184573 A1 * | 10/2003 | Watanabe .................... 345/700 |
| 2003/0200234 A1 * | 10/2003 | Koppich et al. ............ 707/203 |

\* cited by examiner

*Primary Examiner*—Le Hien Luu
(74) *Attorney, Agent, or Firm*—Sughrue Mion Pllc.

(57) ABSTRACT

A management server receives from a server storing information a request that a data input job be executed and from a data input device a request to assign a data input job to itself. The management server makes a list of information to be digitized through data input, based on information held on itself and input-specific information obtained from the server storing information, and transmits the list to a data input device adequate to the data input job. The data input device selects information as data input preference. The data input device obtains the selected information from the server storing information. Through the data input device, its operator inputs the obtained information as computer-usable data. The input data is transmitted to the server storing information. The management server stores, updates, and manages diverse data about input jobs.

14 Claims, 3 Drawing Sheets

IMAGE DATA

| | | |
|---|---|---|
| MGT. NO. | 00001 | A |
| ADDRESS: | 1-10 NISSHIN-CHO, C/T FUCHU, TOKYO | B |
| CORPORATE NAME: | NEC CORPORATION | C |
| CAPITAL: | 250 BILLION | D |
| EMPLOYEES: | 35,000 | E |

FIG. 3

SYSTEM ALLOWING DATA INPUT DEVICE TO REQUEST MANAGEMENT SERVER TO ASSIGN A DATA INPUT JOB TO ITSELF

BACKGROUND OF THE INVENTION

1. Field of the Invention

The present invention relates to a data input method and a data input system and, in particular, to such method and system enabling efficient execution of data input jobs by operators through the use of a network.

2. Description of the Related Prior Art

In general, to convert image information including characters and symbols and audio information into computer-usable data form such as text code, it is required that operators read or listen to such information and type in data, using keyboards. Although OCR, voice recognizer, and similar technologies are advancing, these technologies are still no match for human ability. These technologies are put into use, but, inmost case, the output of these recognition devices needs check by human and reentry or corrective input. As for handwritten manuscripts, slips, information recorded on tape, graphics input, and pictures recorded on film or VTR tape, operators appreciate content thereof and input data as text code.

If a mass of such information is generated and it is necessary to convert the information into text code through manual input for a limited period, it is difficult to secure operators in a required number and perform speedy and reliable transmission and reception of information to be converted into text code by manual input. Always securing a great number of operators just in case of the above situation demands a lot of cost and is almost impossible.

SUMMARY OF THE INVENTION

A data input method as an example of embodiment of the present invention for use in a system comprising a management server, a server storing information, and at least one data input device, wherein the management server, the server storing information, and the data input device are interconnected via a network, comprises the following steps: (a) receiving, at the management server, a request for executing for a data input job from the server storing information and from the data input device a request for assigning a data input job to itself; (b) at the management server, making a list of information to be digitized through data input, based on information held on the management server and input-specific information obtained from the requesting server storing information, and sending the list to the requesting data input device; (c) according to a selection submitted from the data input device, establishing a communication path between the data input device and the server storing information that holds the selected information to be digitized; (d) at the data input device, inputting the information to be digitized, obtained from the server storing information; and (e) sending the input data to the server storing information.

A data input system as an example of embodiment of the present invention comprises a server storing information which stores information to be digitized through data input and sends a request that a data input job be executed, at least one data input device which sends a request to assign a data input job to itself and through which their operators input data from the information to be digitized, and a management server which receives the request from the server storing information and the data input device and control data input jobs, wherein the server storing information, the data input device, and the management server are interconnected via a network.

According to the present invention, parties that have need of data input for converting image, audio, and other information into computer-usable data such as text code can easily secure operators who have required skills and transmission and reception of such information and entered data can easily be performed.

BRIEF DESCRIPTION OF THE DRAWINGS

The above and other objects, features and advantages of the present invention will become apparent from the following detailed description when taken with the accompanying drawings in which:

FIG. 3 shows a specific example of image data.

DETAILED DESCRIPTION OF THE PREFERRED EMBODIMENTS

Figure 1:
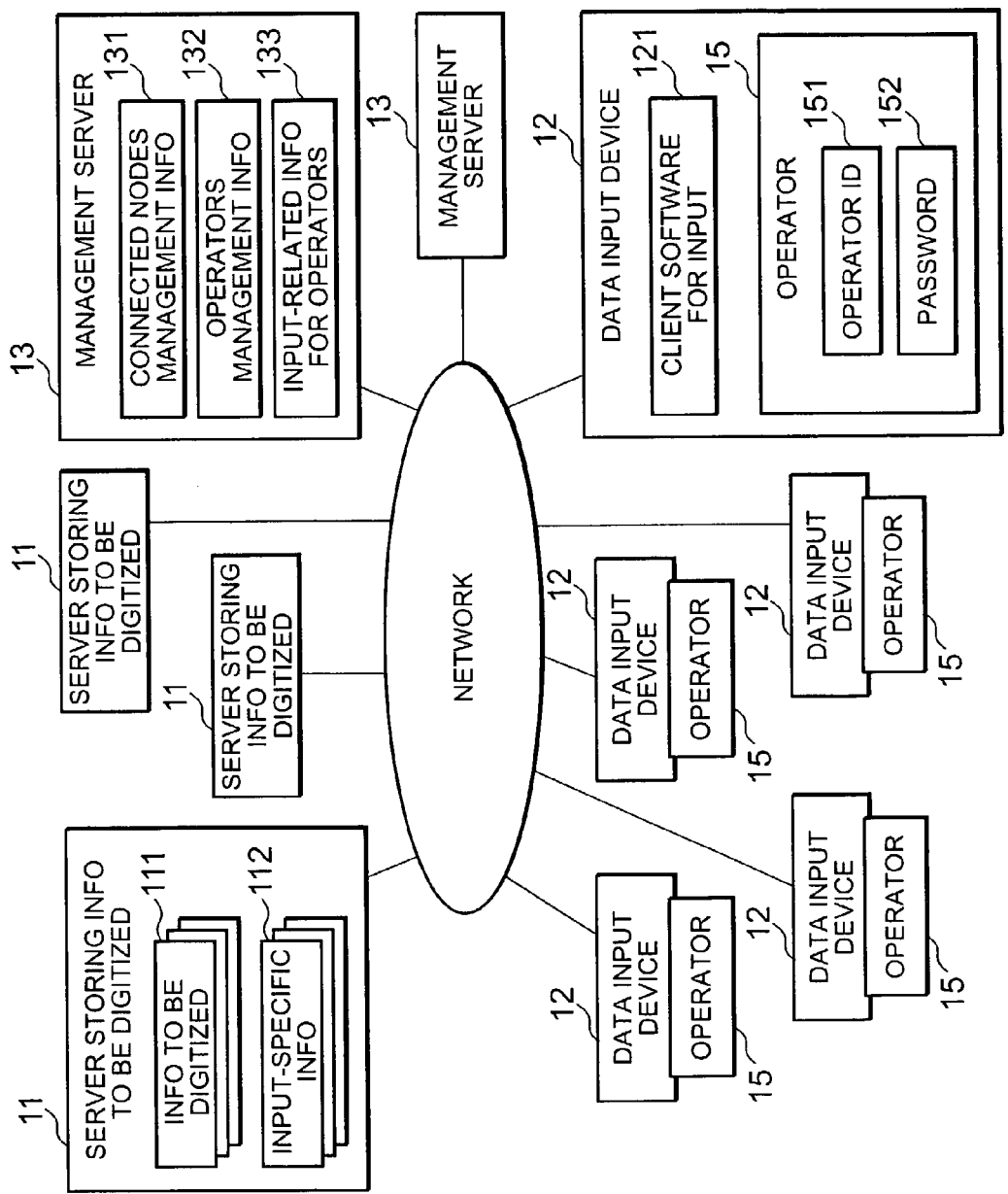
FIG. 1 is a block diagram showing an example of embodiment of a data input system of the present invention.

An example of embodiment of a data input system of the present invention is shown in FIG. 1. The system of this embodiment example comprises a network 14, a plurality of servers storing information to be digitized 11, a plurality of data input devices 12, and a plurality of management servers 13. The servers storing information to be digitized 11, the data input devices 12, and the management servers 13 are interconnected via a network 14. A server storing information to be digitized 11 stores information, for example, image information and audio information, and sends a management server 13 a request that such information be converted into computer-usable data by manual input. A data input device 12 sends a management server 13 a request to assign a data input job to it, obtains information to be digitized from the data input device 12, and executes an input job. A management server 13 receives the above requests and exercises an overall control of data input jobs. Each data input device 12 is operated by one or more operators 15. The operators 15 have their IDs 151 and passwords 152.

A server storing information to be digitized 11 has a CPU and operates under program control. The server 11 has information to be digitized 111 such as image information and audio information stored on recording media. The server 11 also has input-specific information 112 stored, associated with each item of information to be digitized 111. The input-specific information 112 includes, for example, the following: the coordinates of objects in an image; language; conference or lecture labeling; text or audio labeling; input character type such as, for example, Arabian numbers, Kanji, alphabets, symbols, etc.; the number of digits; data formatting flag and format; scheduled completion date/time of data input; data accuracy level required (for example, specifying whether verify input is required to enhance accuracy); language that operator 15 uses; operator's skill level; home ground of operator 15; expertise in a specific field; and the country where operator 15 lives. The foregoing information to be digitized 111 can include information not converted into data at all, information partially converted into data through OCR and voice recognizers, and converted data that needs verify input. The input-specific information 112 can include a type label of information to be digitized 111, indicating one of the above types. When a server storing information 11 sends a request for input, input-specific information 112 is transmitted to the management server 13.

A data input device 12 is a terminal device through which an operator 15 inputs data, for example, a personal computer, mobile terminal (mobile phone, PDA, etc.), and a dedicated terminal. A personal computer provided general-purpose client software such as a WWW browser can be used as a data input device 12. When executing data input, the data input device 12 can receive client software from a management server 13. Using the data input device 12, an operator 15 logs in to a management server 13 via the network 14 and requests the management server to render a server storing information to be digitized 11 and information to be digitized 111. An operator 15 gets one or more items of information to be digitized 111 rendered from the management server 13 and selects information to be digitized 111 as preference. Then, the data input device 12 receives the information 111 from the corresponding server storing information to be digitized 11 and the operator 15 performs data input for converting the information into data. The client software for input can be provided with a function of extracting items to be input from the information to be digitized 111 and a repeatable voice reproduction function, according to the input-specific information 112. The data input device 11 can be provided with an OCR and voice recognizer. Data input by the operator 15 is transmitted via the management server 13 to the corresponding server storing information to be digitized 11.

A management server 13 stores connected nodes management information 131 and makes centralized management of the servers storing information to be digitized 11 and the data input devices 12 connected to the network 14. The management server 13 stores operators management information 132. Using the data input devices 12 for data input jobs, operators 15 register in advance diverse information with the management server 13, including personal information such as address and name, capability/incapability of inputting text, audio, Arabian numbers, Kanji, alphabets, etc., self-declared input skill level, home ground or expertise in a specific field, operator's native language, and wages payment procedure. The management server 13 issues operators' IDs 151 and passwords 152, transmits the IDs and passwords to the operators' data input devices 12, and creates operators management information 132, based on the registered information. Moreover, the operators management information 132 can include the operators 15 on/off flags to indicate whether information to be digitized has been assigned to the operators. Based on data input skill tests made for the operators 15 and checks on actual input job performance, the management server 13 can update skill ranking (input skill level) of the operators 15 included in the operators management information 132 at any time. Also, the management server 13 can store information on the machine specifications of the data input devices 12 used by the operators 15.

The management server 13 can receive input-specific information 112 from a plurality of servers storing information to be digitized 11, aggregate this information from the above servers, and create and store input-related information for operators 133 together with the operators management information 132. The input-related information for operators 133 includes, for each information to be digitized 111, its input-specific information 112, identification of the server storing information to be digitized 11 that issued an request for input operation, identification of the data input device 12 to which the input job was assigned, and completion/incompletion of the input job. If information to be digitized 111 is registered in the input-related information for operators 133 and no data input device 12 is set to do its input, the information to be digitized 111 is regarded as awaiting input operation. Information to be digitized 111 which is managed by the management server 13 is not always dependent one and may be a part of serial information.

From a data input device 12, when receiving a request to assign a data input job to it, the management server 13 can list items of information to be digitized 111 and servers storing the items of information to be digitized 11 appropriate for the skill and other conditions of its operator 15, based on the operators management information 132 and input-related information for operators 133, and send this list to the data input device 12.

The data input device 12 can display the list on the screen. The operator 15 selects information to be digitized 111 from the list. The management server 13 transmits the connected nodes management information 131 to the data input device 12 and the server storing information to be digitized 11 that has the selected information to be digitized 111. Then, the server storing information to be digitized 11 and the data input device 12 become able to do direct communication therebetween.

If verify input is executed, that is, two or more different operators perform data input from same information to be digitized, the management server 13 can control distribution of the information to be digitized 111, verify the results of input jobs performed by the different operators, and return only final data after verified to the server storing the information to be digitized 11. Moreover, the management server 13 can update the input skill of each operator stored in the operators management information 132. According to job request from the server storing information to be digitized 11, the management server 13 can make a constant connection of a particular operator 15 and his or her data input device 12 to the server storing information to be digitized 11. Thereby, the server storing information to be digitized 11 can secure a reliable operator that has expert-level skill and security and privacy can be assured.

Figure 2:
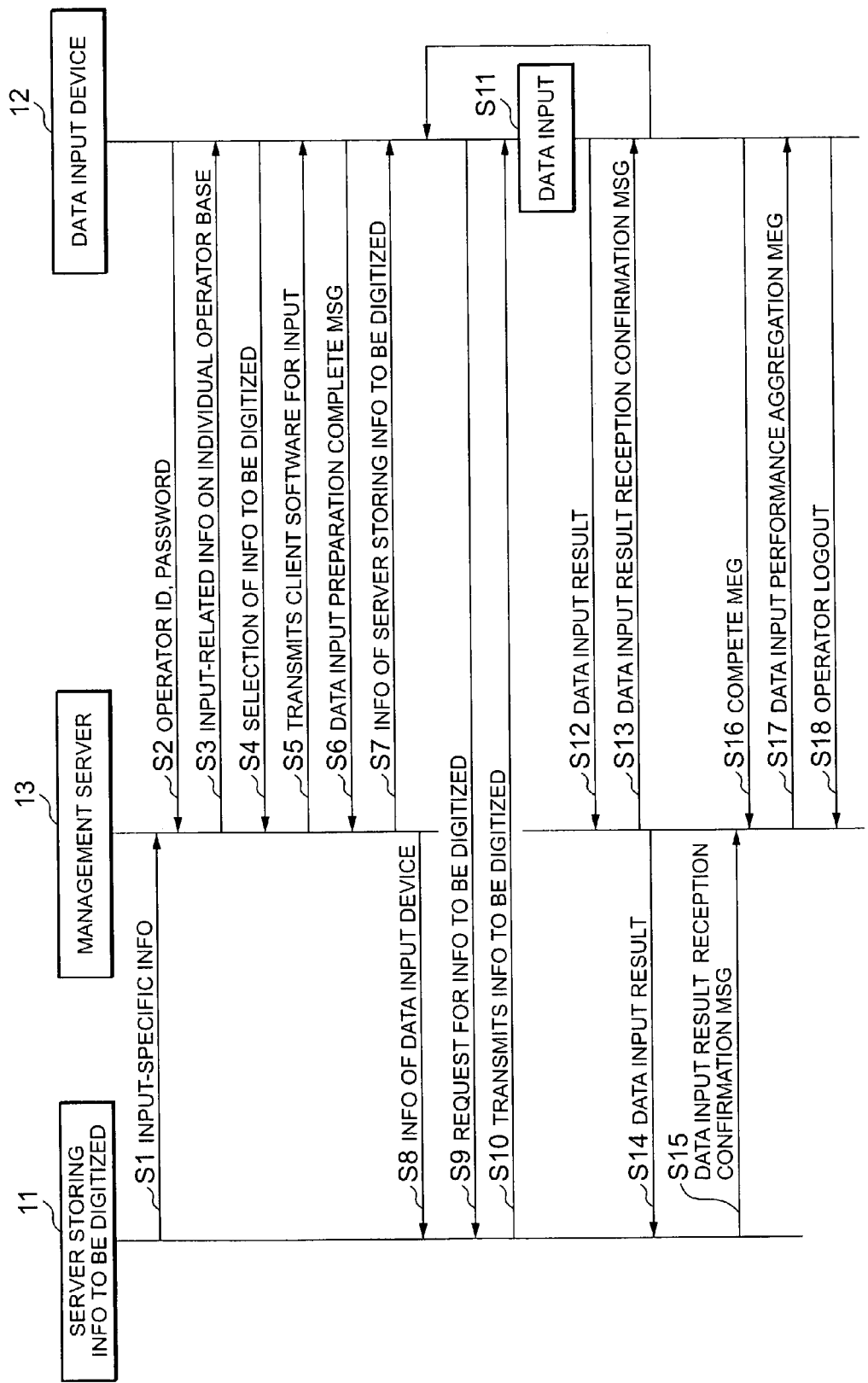
FIG. 2 is a connection sequence diagram showing an example of embodiment of a data input method of the present invention.

Referring to FIG. 2, an example of embodiment of input operation procedure is described. A server storing information to be digitized 11 transmits input-specific information 112 to a management server 13, thus notifying the management server 13 of the presence of information to be digitized 111 for which input operation is required. The management server 13 stores the received input-specific information 112 as the input-related information for operators 133 (S1). From a data input device 12, an operator 15 sends the management server 13 a request to assign an input job to it. At this time, the operator 15 enters its operator ID 151 and password 152 and logs in to the management server (S2). The management server 13 verifies that the operator ID 151 and password 152 are included in the operators management information 132 and searches through the input-related information for operators 133 by the operator's information registered in the operators management information 132. The management server 13 transmits input-related information (a list of information items to be digitized) on individual operator base, in which items of information to be digitized 111 appropriate for the operator have been listed, to the data input device 12 (S3). If skill and other conditions of the operator 15 do not agree with input requirement conditions specified by the server storing information to be digitized 11, it is possible to list information items to be digitized that are as near to a match as possible. The operator 15 selects information to be digitized as preference from the input-related information (a list of information items to be digitized) on individual operator base displayed on the screen of the data input device 12. The data input device 12 transmits the input as the selection of the information to be digitized to the management server 13 (S4). If the operator 15 selects none of information to be digitized 111 because of condition mismatch, the management server 13 sets a wait state flag for the relevant operator ID 151 in the operators management information 132 and notifies the data input device 12 of the wait state. When the operator 15 selects information to be digitized, the management server 13 transmits client software 121 necessary for the job of inputting the information to be digitized 111 to the data input device 12 (S5). If client software installed in advance on the data input device 12 is ready for use, the above transmission of client is not necessary. When the data input device 12 receives the client software 121 and completes preparation for input, an input preparation complete message is transmitted to the management server 13 (S6).

Having received the input preparation complete message, the management server 13 transmits information of the data input device to the server storing information to be digitized 11 (S7) and transmits information of the server storing information to be digitized to the input device 12 (S8). The management server 13 stores the identification of the data input device 12 to which the input job has been assigned as the input-related information for operators 133. The above data input device 12 sends a connection request directly to the server storing information to be digitized 11, according to the received information of the server storing information to be digitized, and issues a request to transmit the selected information to be digitized 111 (S9) When the data input device 12 receives the information to be digitized from the server storing information to be digitized 11 (S10), it reproduces and displays the information on the screen under the control of the client software 121 for input. The operator 15 performs the input job, based on the content of the information to be digitized 111, displayed on the screen of the data input device 12. When the operator 15 completes the required input job, the input result is transmitted to the management server 13 (S11, S12). When having received the input result, the management server 13 transmits an input result reception confirmation message to the data input device 12 (S13). The management server 13 transmits the input result in real time or in a batch at a time to the server storing information to be digitized 11 (S14). When having received the input result, the server storing information to be digitized 11 transmits an input result reception confirmation message to the management server 13 (S15). When the operator 15 completes all operation, the data input device.12 transmits an operation complete message to the management server 13 (S16). Having received the input result reception confirmation message, the management server 13 acquires data on the job case (job type, an error rate for input result, etc.) and performance results (work count, work time, etc.), based on the received input result and input result reception confirmation message, and stores such data as input performance aggregation data per operator ID and information to be digitized. Moreover, the management server 13 calculates a rate of input work, based on the performance results (workcount, worktime, the number of typed-in characters, etc.), and updates the input skill level of the relevant operator ID in the operators management information 132. The management server 13 reads input performance aggregation data acquired after the data input device 12 starts the job and until it has transmitted the complete message, calculates completion results as summation of the input performance aggregation data, and stores them per operator ID and information to be digitized. Furthermore, the management server 13 calculates and stores the following: wages to be paid to the operator 15, based on the completion results data, and a charge (as brokerage fees) to be billed to the server storing information to be digitized 11. Furthermore, the management server 13 sets a job complete flag for the relevant data input device 12 and operator as assignment management data in the input-related information for operators 133. Besides, the management server 13 extracts the input performance aggregation data and transmits it to the data input device 12 (S17). When the operator 15 logs out of the data input device 12, the communication paths to the server storing information to be digitized 11 and the management server 13 are released (S18).

If the server storing information to be digitized 11 demands verify input, that is, data input should be performed by two or more different operators from same information to be digitized for input accuracy enhancement, the management server 13 selects a plurality of data input device 12 and compares the input results received from these devices 12. Then, the management server 13 returns only the final result to the server storing information to be digitized 11 and updates the input accuracy for each operator in the operators management information 132. If information to be digitized 111 is one of the pieces constituting some information, a set of codes must be assigned to the pieces of information to maintain sequence. For example, it is possible to assign a common identifier to all the pieces of information to be digitized and suffix extensions (for example, "-1,""-2," . . . ) to each piece of information. Thus, the management server 13 assigns the pieces of information to different data input devices 12 and makes management thereof by referring to the extensions.

If, from a plurality of data input devices 12, the management server 13 has received requests to assign input jobs to them, the server operation is as follows. First, a server storing information to be digitized 11 sends a request for input and input-specific information 112 to the management server 13. The management server 13 stores the input-specific information 112 as the input-related information for operators 133. Next, the management server 13 searches through the operators management information 132, finds the data input devices 12 with the "ON" flag indicating that the device is awaiting job assignment to it, and fixes these devices as candidates of input operation. From the candidates, the management server 13 selects data input device(s) 12 whose operator 15 has required input skill, based on the operators management information 132 and input-related information for operators 133. The management server 13 creates input-related information (a list of information items to be digitized) on individual operator base and transmits it to the selected data input device(s) 12. At this time, the same input-related information on individual operator base can be transmitted to a plurality of data input devices 12.

Referring to FIG. 3, an example of image data to be input is shown. A server storing information 11 divides the image data into separate items and holds the separate pieces of information (A-E) as the items of information to be digitized 111. After the management server 13 selects data input devices 12, when communication paths are established between the server storing information to be digitized 11 and a plurality of data input devices 12, the server storing information to be digitized 11 transmits the pieces of information to be digitized 111 to the data input devices 12, respectively. By using this manner, the security of the corporate information can be assured. The server storing information to be digitized 11 can reassemble input results received into the information.

If a mass of data is handled, it is desirable to install an independent management server 13. However, if the system includes only a small number of servers storing information to be digitized 11 and data input devices 12, the function of the management server can be integrated into any of these servers 11, 12. As the data input devices, home computers, mobile terminal device, and the like can be used. As the client software 121 for input, general-purpose client software such as a WWW browser or JAVA (registered trademark) application software can be used.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A data input method for use in a system comprising a management server, a server storing information, and at least one data input device, wherein the management server, the server storing information, and the data input device are interconnected via a network, said data input method comprises the steps of:

receiving, at a management server, a request for executing a data input job from the server storing information and from the data input device a request for assigning a data input job to itself;

at the management server, making a list of information to be digitized through data input, based on information held on said management server and input-specific information obtained from said requesting server storing information, and sending the list to said requesting data input device;

according to a selection submitted from the data input device, establishing a communication path between the data input device and the server storing information that holds the selected information to be digitized;

at the data input device, inputting the information to be digitized, obtained from the server storing information; and sending an input data to the server storing information.

2. The data input method as recited in claim 1, wherein:
   said information held on the management server includes information about the server storing information and the data input device and information about one or more operators who input data through the data input device.

3. The data input method as recited in claim 2, wherein:
   said information to be digitized, held on the servers storing information, includes at least either of image information and audio information;
   said input-specific information includes at least one of the following: attributes of said information to be digitized, conditions about the operators, and conditions about input jobs; and said information about the operators includes information about the skills of the operators.

4. The data input method as recited in claim 1, wherein:
   said list is transmitted to a data input device whose operator meets the contents of said input-specific information.

5. The data input method as recited in claim 1, wherein:
   said information to be digitized is input by two or more operators.

6. The data input method as recited in claim 1, wherein:
   the data input device transmits input data to the management server and the management server transmits the data to the server storing information.

7. The data input method as recited in claim 1, further comprising a step in which the management server evaluates the input result of the operator and stores the result of the evaluation.

8. The data input method as recited in claim 1, further comprising a step in which the management server calculates performance results of a data input job and calculates a charge and wages, based on the performance results.

9. The data input method as recited in claim 1, wherein:
   the server storing information transmits pieces of information to be digitized, receives input data corresponding to the pieces of information, and reassembles the input data into the information.

10. A data input system comprising:
    a server storing information which stores information to be digitized through data input and sends a request that a data input job be executed;
    at least one data input device which sends a request to assign a data input job to itself and through which their operators input data from said information to be digitized; and
    a management server which receives said requests from the server storing information and the data input device and control data input jobs;
    wherein said server storing information, said data input device, and said management server are interconnected via a network.

11. The data input system as recited in claim 10, wherein:
    the management server has information about the server storing information and the data input device and operator information about operators who input data through the data input device; and makes a list of information to be digitized, based on said information and input-specific information held on the server storing information that sends the request that a data input job be executed and transmits the list to the data input device that sends said request.

12. The data input system as recited in claim 11, wherein:
    the data input device whose operator has skill required by the server storing information receives the list.

13. The data input system as recited in claim 10, wherein:
    the data input device is a computer.

14. The data input system as recited in claim 10, wherein:
    the data input device is a mobile communication terminal.

* * * * *

UNITED STATES PATENT AND TRADEMARK OFFICE
CERTIFICATE OF CORRECTION

| | | |
|---|---|---|
| PATENT NO. | : 7,308,472 B2 | Page 1 of 1 |
| APPLICATION NO. | : 10/455615 | |
| DATED | : December 11, 2007 | |
| INVENTOR(S) | : Takeshi Hasegawa | |

It is certified that error appears in the above-identified patent and that said Letters Patent is hereby corrected as shown below:

On the title page item (54) & col. 1, line 1,

Delete "SYSTEM ALLOWING DATA INPUT DEVICE TO REQUEST MANAGEMENT SERVER TO ASSIGN A DATA INPUT JOB TO ITSELF"

and insert -- METHOD AND SYSTEM FOR EXECUTING DATA INPUT JOBS --

Signed and Sealed this

Third Day of August, 2010

David J. Kappos
*Director of the United States Patent and Trademark Office*